United States Patent [19]
Yamagishi et al.

[11] Patent Number: 5,451,880
[45] Date of Patent: Sep. 19, 1995

[54] BATTERY-CHARGING CIRCUIT

[75] Inventors: Hirokazu Yamagishi; Makio Kojima, both of Yokohama, Japan

[73] Assignee: Furukawa Denchi Kabushiki Kaisha, Yokohama, Japan

[21] Appl. No.: 73,659

[22] Filed: Jun. 8, 1993

Related U.S. Application Data

[63] Continuation of Ser. No. 797,017, Nov. 25, 1991, abandoned.

[30] Foreign Application Priority Data

Nov. 27, 1990 [JP] Japan .................................. 2-323879
Sep. 27, 1991 [JP] Japan .................................. 3-324985

[51] Int. Cl.$^6$ ......................................... G01N 27/4.6
[52] U.S. Cl. .................................... 324/429; 320/48
[58] Field of Search .................. 324/429, 427; 320/48; 340/636

[56] References Cited

U.S. PATENT DOCUMENTS

| | | | |
|---|---|---|---|
| 3,576,487 | 4/1971 | Chase | 320/39 |
| 3,784,892 | 1/1974 | Zelina | 320/40 |
| 3,880,072 | 7/1974 | Charbonnier et al. | 320/48 |
| 3,940,679 | 2/1976 | Brandwein et al. | 320/48 |
| 4,137,493 | 1/1979 | Smith | 320/48 |
| 4,361,809 | 11/1982 | Bil et al. | 324/429 |
| 4,670,703 | 6/1987 | Williams | 320/22 |
| 4,727,306 | 2/1988 | Misak et al. | 320/48 |
| 4,888,544 | 12/1989 | Terry et al. | 320/37 |

FOREIGN PATENT DOCUMENTS 0005841 12/1979 European Pat. Off. .
0100753 2/1984 European Pat. Off. .
2237696 5/1991 United Kingdom .

*Primary Examiner*—Maura K. Regan
*Attorney, Agent, or Firm*—Armstrong, Westerman, Hattori, McLeland & Naughton

[57] ABSTRACT

A battery-charging circuit capable of promptly detecting, during quick charging, an abnormality of a secondary battery of a battery, if any, and making it impossible to continue the quick charge thereafter. As a battery-charging circuit for quickly charging a secondary battery with a predetermined charging current from a battery-charging power source having a constant-characteristic, the battery charging circuit includes a voltage-measuring device for measuring the secondary battery voltage at predetermined regular time intervals; a voltage-setting device for presetting a reference voltage value at a level higher, by a predetermined magnitude, than an expected charge complete voltage value; a comparator device for comparing with the preset reference voltage value a battery voltage actually measured during the quick charge operation; and a current limiter circuit for stopping the quick charge when the battery voltage has risen to the reference voltage value.

3 Claims, 2 Drawing Sheets

BATTERY-CHARGING CIRCUIT

This application is a continuation of application Ser. No. 07/797,017 filed Nov. 25, 1991, now abandoned.

BACKGROUND OF THE INVENTION

1. Field of the Invention

This invention generally relates to a battery-charging circuit for a quick charge of a secondary battery.

2. Description of the Relevant Art

Various kinds of secondary batteries are used as power sources for industrial and/or household electrical machines and appliances. The range of applications for these kinds of secondary batteries has now expanded to cover a wider area of use, wherein a single small-sized secondary battery consisting of only one cell (such as, a Ni-Cd battery) or an assembled battery having two or more such batteries connected in series to one another, is used as the power source for a cordless telephone, a video recorder or other household electrical appliances. In such applications, the secondary battery has to be repeatedly charged whenever necessary during use. In general, the most widely used type of this kind of battery charge is a quick or rapid charge carried out with a charging current of 0.5 C or at a higher rate. In this case, the quick charge is controlled so as to avoid possible overcharge of the secondary battery and the charge control system (such as, a $-\Delta V$ control system, a temperature control system or the like) is selected for purposes of charge control. After completion of the quick charge, it is a general practice to switch the charge to a trickle charge.

The secondary battery have drawbacks when subjected to a repeated charge and discharge operation for a number of times during its use. The drawbacks include the electrolyte impregnated in a predetermined amount in the battery becoming so greatly decreased so as to cause lack thereof or insufficiency of electrolyte, and the electrodes becoming inactive by oxidation. These conditions bring about an excessive increase in the electric resistance, as well as an excessive decrease in the discharge capacity; thus, making the battery unsuitable for reuse. Even when the battery has become abnormal, as discussed above, it is not possible to determine this abnormal condition from external appearances. In the conventional practice, therefore, even a user does not notice the occurrence of such an abnormality of the battery, and the quick charge is continuously provided thereto under the $-\Delta V$ control system and/or the temperature control system or the like for further use as if the battery were normal.

In addition, danger exists in such an abnormal battery in that it could give rise to an unusual and problematic heat generation during the quick charge. Furthermore, when a plurality of batteries (e.g., an assembled battery or a battery pack including a plurality of the second batteries connected in series to one another and packed in a package) is charged through the quick charge under the temperature control system, and is considered to have been fully charged if the temperature control element (in the battery pack near the assembled battery for detecting the battery temperature) detects that the temperature thereof has reached the present level becomes problematic when the battery is reused when in fact it is not reusable.

Therefore, an object of the present invention is to provide a battery charging circuit which is capable of promptly detecting the above-described abnormality of the secondary battery while the quick charge is ongoing; thereby, avoiding the above-described disadvantage of the conventional practice.

SUMMARY OF THE INVENTION

The aforementioned and other objects of the present invention are accomplished by providing a battery-charging circuit capable of quickly charging at least one of secondary batteries, each comprising at least one cell, with a predetermined charging current from a battery-charging power source having a constant-current characteristic.

The battery-charging circuit includes a voltage-measuring device for measuring the secondary battery voltage at predetermined regular time intervals, a voltage-setting device for presetting a reference voltage value at a level that exceeds, by a predetermined magnitude, a battery voltage which is expected to be attained upon completion of the charge. The battery-charging circuit further includes a comparator device for comparison between the reference voltage preset by the voltage-setting device and a battery voltage actually measured by the voltage-measuring device, and a current limiter circuit for stopping the quick discharge when the comparator device detects that the secondary battery voltage has risen to reach the above-mentioned preset references voltage value.

The quick charge of the secondary battery starts as a charging-current of 0.5 C to 2 C supplied by the battery-charging power source having a constant-current characteristic and applied to the secondary battery. The secondary battery voltage measured by the voltage-measuring device at predetermined regular time intervals is taken as one of the two voltages for comparison by the comparator device. The preset reference voltage value is the other value used for comparison by the comparator device and may be set at a level higher, by a predetermined magnitude (e.g., about 20%), than a secondary voltage which is expected to be attained upon completion of the quick charge. Therefore, when the secondary battery voltage measured and detected during the quick charge has reached the preset reference voltage value, the comparator device outputs a signal whereby the current limiter circuit is actuated to stop the quick charge. As a result, an attending worker is made aware of the presence of an abnormality of the battery, while the quick charge is thereafter discontinued.

These and other features of the invention will be understood upon reading of the following description along with the drawings.

DETAILED DESCRIPTION OF THE PREFERRED EMBODIMENTS

Figure 1:
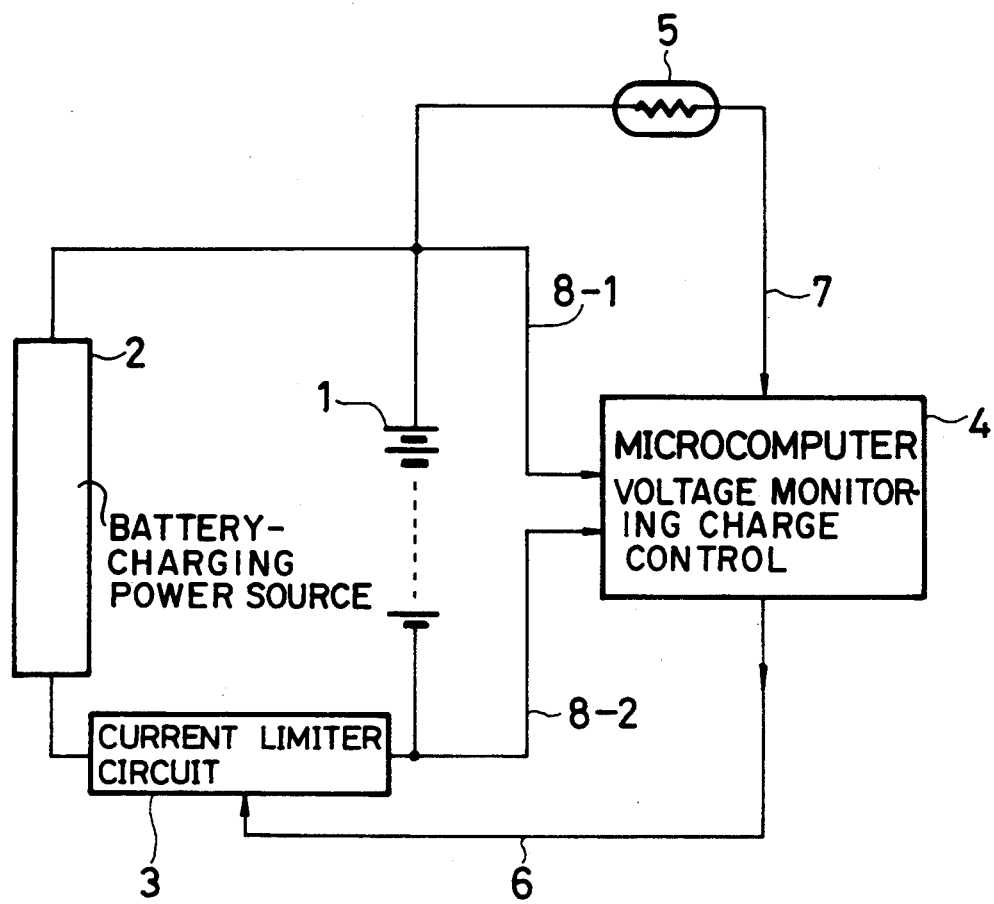
FIG. 1 is a block diagram showing the battery-charging circuit according to one embodying example of the present invention.

Referring now to the accompanying drawings, FIG. 1 is a block diagram showing the structural arrangement of the battery-charging circuit according to one embodying example of the present invention. In FIG. 1, numeral 1 denotes a secondary battery to be charged through a quick charge. A secondary battery being (e.g., a so-called battery pack; namely, an assembled battery) includes, for instance, ten units of Ni-Cd batteries, each with a nominal voltage of 1.2 V, connected in series to one another and packed in a thermal-shrink type package, wherein each battery comprises, for example, one cell. Numeral 2 denotes a battery-charging power source for the assembled battery 1; numeral 3 stands for a current limiter circuit (e.g., a switch), numeral 4 refers to a microcomputer, numeral 5 refers to a thermistor, numeral 6 refers to a quick charge stop signal line, numeral 7 refers to a temperature detection line, and numerals 8-1 and 8-2 refer to voltage detection lines. As discussed later in more detail, the microcomputer 4 is an apparatus capable of comprehensively dealing with the measurement of the voltage of the assembled battery 1 at predetermined regular time intervals, presetting the predetermined reference voltage value which may be, for example, 20% higher than the secondary battery voltage expected to be attained upon completion of the charge, and comparing with the reference voltage value preset, at the predetermined value level, a secondary battery voltage actually measured and detected.

The microcomputer 4, according to the embodying example of the present invention, comprises the voltage-measuring device for measuring the secondary battery voltage at predetermined regular time intervals; the voltage-setting device for presetting the reference voltage value at a level exceeding, by a predetermined magnitude, a secondary battery voltage which is expected to be attained upon completion of the charge; and the comparator device used for comparing between a measured secondary battery voltage and a preset reference voltage value and for additionally monitoring these voltages.

Furthermore, as explained later in more detail, the microcomputer 4 is such that it provides a battery-charge control under which the quick charge is stopped by comparing the detected battery voltage value with the preset reference voltage value and a $-\Delta V$ control system and/or a temperature control system under which the charge is controlled. In addition, the microcomputer 4 receives temperature readings of the assembled battery 1 through the voltage detection lines 8-1 and 8-2, and measures the temperature readings by means of the temperature detection line 7 equipped with the thermistor 5. The preset reference voltage value exceeding, by a predetermined magnitude (e.g., 20%), the secondary battery voltage expected to be attained upon completion of the charge may be set as described hereinafter.

For charging the assembled battery 1 having ten units of Ni-Cd batteries, each comprising one cell, connected in series to one another, the battery voltage expected to be attained upon completion of the charge is 15 V (i.e., 1.5 per cell); whereas, the reference voltage value for comparison by which to determine if the above-described abnormality of the assembled battery has occurred in this case is 18 V (i.e., 1.8 V per cell) which is higher than the expected charge complete voltage of 15 V, the reference voltage value of 18 V being taken as one of the two voltages for comparison by the comparator device.

A trickle battery-charging circuit (not shown) may be additionally included in the battery-charging circuit of the present invention when necessary so that when the quick charge of the assembled battery 1 has been completed in a normal manner, the charging channel may be switched over by means of a control line (not shown) for a trickle charge of the battery.

When the microcomputer detects, through the voltage detection lines 8-1 and 8-2, that the secondary battery pack being charged through the quick charge with a charging current of, e.g., 1 C, has been sufficiently charged so as to show that its voltage at both terminals thereof has risen to the above-mentioned preset voltage of 18 V, the microcomputer 4 then cuts off the current limiter circuit 3 through the quick charge stop signal line 6; thereby, carrying out the battery-charge control so as to stop the quick charge. As long as the battery pack being charged through the quick charge shows that the battery voltage remains normal or is within the allowable range, the quick charge is allowed to go on under the charge control carried out by means of the $-\Delta V$ control system or the temperature control system until it has become fully charged through such a normal charge. Indicator lamps may be used to indicate the premature stop of the quick charge due to the above-discussed battery abnormality and the normal temperature of the quick charge; thus, making it easier to monitor the state of the charge. Through this means, an abnormality involved in the battery pack, if such is present, can be readily detected. Consequently, the battery pack can be deemed as no longer reusable and is then preferably replaced with a new battery pack.

Figure 2:
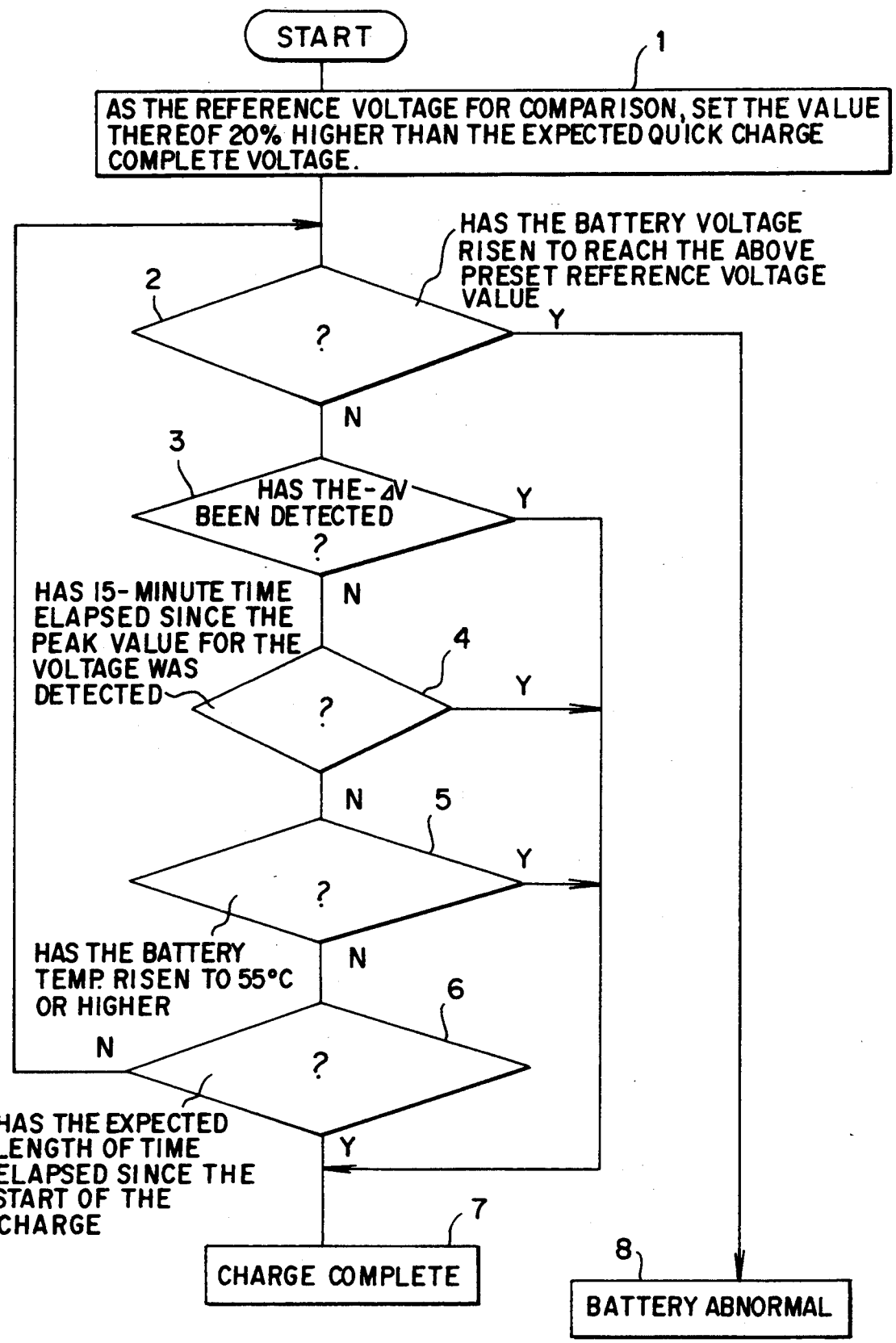
FIG. 2 is a flow chart showing an operation of the microcomputer incorporated in the battery-charging circuit of this invention.

FIG. 2 is a flow chart showing the operation of the microcomputer 4. With reference to FIG. 2, it is in step 1 following the start of the battery-charge operation that the reference voltage value of 20% higher than the expected quick charge complete voltage of 15 V (namely, 1.5 V per cell) of the assembled battery is set as one of the two voltages for the voltage comparison and then inputted into the microcomputer 4 as the present reference voltage value.

In step 2, the voltage of the assembled battery is compared at predetermined regular time intervals with the reference voltage value. When the voltage of the assembled battery has reached 18 V (or 1.8 V per cell), the microcomputer's decision should be affirmative or yes in order to advance the operation thereof to step 8 where the battery is dealt with as an abnormal battery. If the decision in step 2 is negative or no, the operation is advanced to step 3 where it is determined whether or not the quick-charge is taking place. Whether or not the $-\Delta V$ has been detected is also determined in step 3.

In step 4, it is determined whether or not 15 minutes have elapsed from the point when the peak value of 15 V for the voltage at both terminals of the assembled battery has been detected. In step 5, it is determined whether or not the battery temperature has risen beyond 55° C., while in step 6 it is determined, through time monitoring, whether or not more than the expected time length for the quick charge completion has elapsed.

When the decision is affirmative or yes in each of steps 3 through 6, the operation is then advanced from each step to step 7 in order to complete the charge. The battery may then be switched over for a trickle charge if necessary. If the decision in step 6 is negative or no, it is then indicated that the quick charge is not complete so that the operation is returned to step 2 in order to repeat the operation all over again from the voltage comparison step.

Described in the foregoing is the embodying example in which the battery-charging circuit, according to the present invention, is applied to the quick charge of an assembly of ten batteries, each comprising one cell. The battery-charging circuit according to the present invention is likewise applicable to an assembly of two or more secondary batteries, each comprising a plurality of cells; a secondary battery having one cell; or a secondary battery comprising two or more cells. When the terminal voltage of each type of battery, as described above, has reached the reference voltage value so set as to exceed, by a predetermined magnitude, an expected quick charge complete voltage, as discussed in the foregoing description, while the quick charge thereof through the battery-charging circuit designed according to the present invention is taking place, the abnormality of the battery is then detected therefrom and the quick charge is thereafter discontinued so that any subsequent charge for the battery can be avoided which would otherwise bring about the danger of an abnormal generation of heat.

In addition to the Ni-Cd battery, Ni-MH (nickel-hydrogen) battery and various other types of secondary batteries can be charged likewise through the battery-charging circuit according to the present invention, and the abnormality of the battery, if present, can be detected at an early stage during the charging operation, as discussed in the foregoing description. The preset reference voltage value for detecting the abnormality of the battery can vary with the type of secondary battery employed and is determined on the basis of the normal voltage range applicable to each particular type of secondary battery.

Thus, the battery-charging circuit according to the present invention provides significant advantages and benefits, including a quick charge through the battery-charging circuit applied to a secondary battery which includes one or more abnormal cells having decreased electrolyte or inactive electrodes resulting in increase in electrical resistance. The battery-charging circuit of this invention further detects abnormality of the battery since the battery voltage in such a condition rises so much as to reach the reference voltage value set to exceed, by a predetermined magnitude, the expected complete voltage, and stops the quick charge at that moment; thereby, avoiding the disadvantage of the conventional practice; that is, the problem whereby even when a secondary battery includes therein an abnormal cell, the defect of the battery is left unnoticed, and is charged all the way by the quick charge controlled by the $-\Delta V$ control system and/or the temperature control system, and thereafter, the charged battery is reused.

While the invention has been particularly shown and described in reference to preferred embodiments thereof, it will be understood by those skilled in the art that changes in form and details may be made therein without departing from the spirit and scope of the invention.

What is claimed is:

1. A battery-charging circuit, through which at least one secondary battery having at least one cell, is quickly charged with a predetermined charging current, comprising:
    a battery-charge control means operably coupled to said secondary battery, for stopping the quick charge when the secondary battery has become fully charged;
    a voltage monitoring and charge control means, directly connected to said at least one secondary battery, for detecting abnormality of said battery during charging thereof and before being fully charged to thereby detect abnormality of said battery and detect that the battery is incapable of being reused, wherein the voltage monitoring and charge control means detects abnormality of said battery when voltage of said battery has risen to a preset reference voltage value which is at a predetermined level higher than an expected charge complete voltage, said voltage monitoring and charge control means including:
        a voltage-measuring means for measuring a secondary battery voltage at predetermined regular time intervals,
        a voltage-setting means for presetting said reference voltage value at a level higher, by a predetermined magnitude, than said expected charge complete voltage, and
        a comparator means for comparing between said reference voltage value preset by said voltage-setting means and said secondary battery voltage actually measured by said voltage-measuring means;
    a battery-charging power source means, operably connected to said at least one secondary battery and to said voltage monitoring and charge control means, for charging said secondary battery; and
    a current limiter circuit means, operably connected to said at least one secondary battery and to said voltage monitoring and charge control means, for stopping the charge when said secondary battery voltage has risen to reach said present reference voltage value.

2. The battery-charging circuit as set forth in claim 1, further comprising a temperature monitoring means, operably connected to said at least one secondary battery and to said voltage monitoring and charge control means, for monitoring temperature readings of said at least one secondary battery and for inputting the monitored temperature readings to said voltage monitoring and charge control means.

3. The battery-charging circuit as set forth in claim 1, further comprising a trickle battery circuit included in the battery-charging circuit so that when the quick charge of the secondary battery has been completed in a normal manner, a charging channel may be switched over to the trickle charge.

* * * * *